(No Model.) 3 Sheets—Sheet 1.

A. D. WHEELER.
APPARATUS FOR TESTING ELECTRIC CIRCUITS.

No. 383,605. Patented May 29, 1888.

Witnesses.
E. K. Boynton

Inventor.
Alden D. Wheeler.

(No Model.)   3 Sheets—Sheet 2.

A. D. WHEELER.
APPARATUS FOR TESTING ELECTRIC CIRCUITS.

No. 383,605. Patented May 29, 1888.

Witnesses.  
E. K. Boynton

Inventor.  
Alden D. Wheeler.  
H. E. Lodge Atty.

(No Model.)  3 Sheets—Sheet 3.

A. D. WHEELER.
APPARATUS FOR TESTING ELECTRIC CIRCUITS.

No. 383,605. Patented May 29, 1888.

Witnesses.
E. K. Boynton.

Inventor.
Alden D. Wheeler.
H. E. Lodge, Atty.

UNITED STATES PATENT OFFICE.

ALDEN D. WHEELER, OF HYDE PARK, MASSACHUSETTS.

APPARATUS FOR TESTING ELECTRIC CIRCUITS.

SPECIFICATION forming part of Letters Patent No. 383,605, dated May 29, 1888.

Application filed February 2, 1888. Serial No. 262,785. (No model.)

*To all whom it may concern:*

Be it known that I, ALDEN D. WHEELER, a citizen of the United States, residing at Hyde Park, in the county of Norfolk and State of Massachusetts, have invented certain new and useful Improvements in Apparatus for Testing Electric Circuits; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to electric alarm circuits, particularly those in which a series of thermostats are employed to automatically create an alarm when subjected to excessive heat.

The purpose of my invention is to arrange the various circuit-wires in the several systems in such manner that the breaking of a wire in a certain system will not impair the efficiency of any thermostat in said system, and in connection with said systems employ a circuit-testing apparatus, such that if a break exists at any point it can readily be discovered and located.

My invention is equally applicable to electric-light circuits or telephone-lines, as will be apparent by the description hereinafter given.

Figure 1:
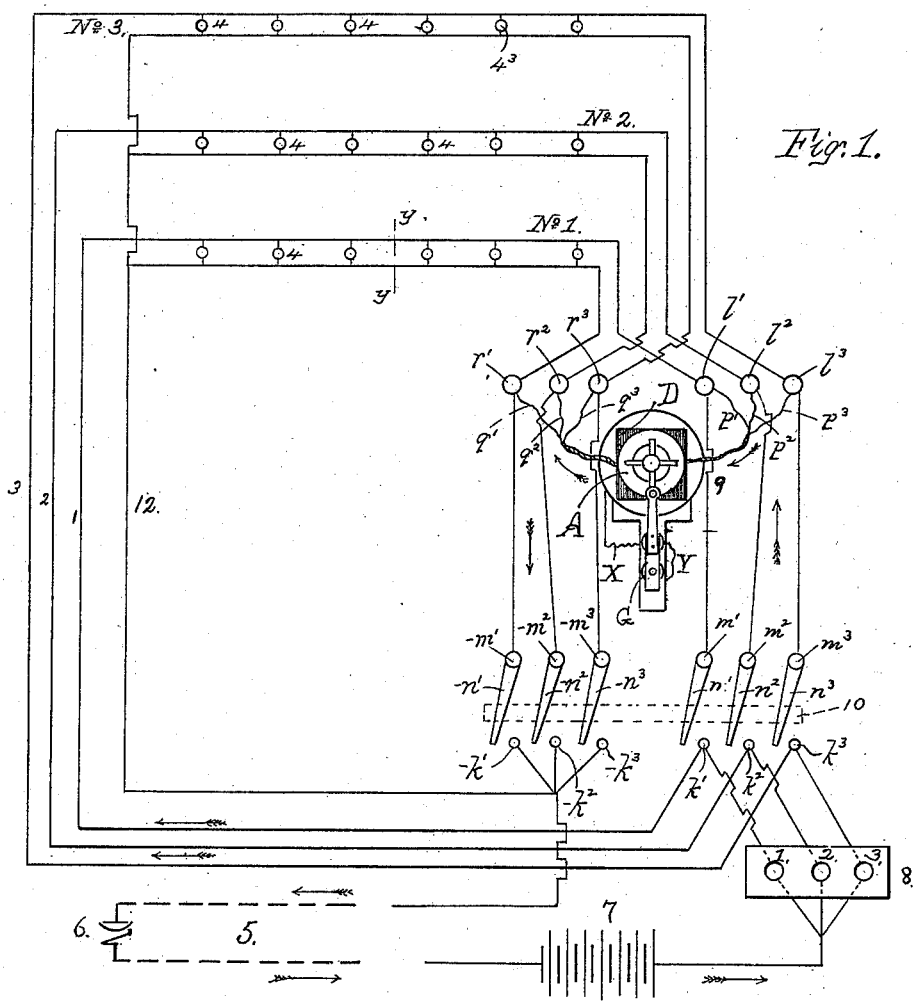
Figure 2:
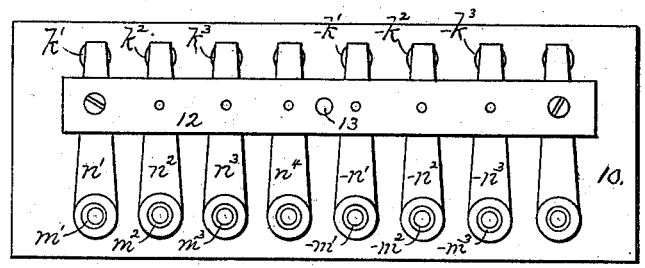
Figure 3:
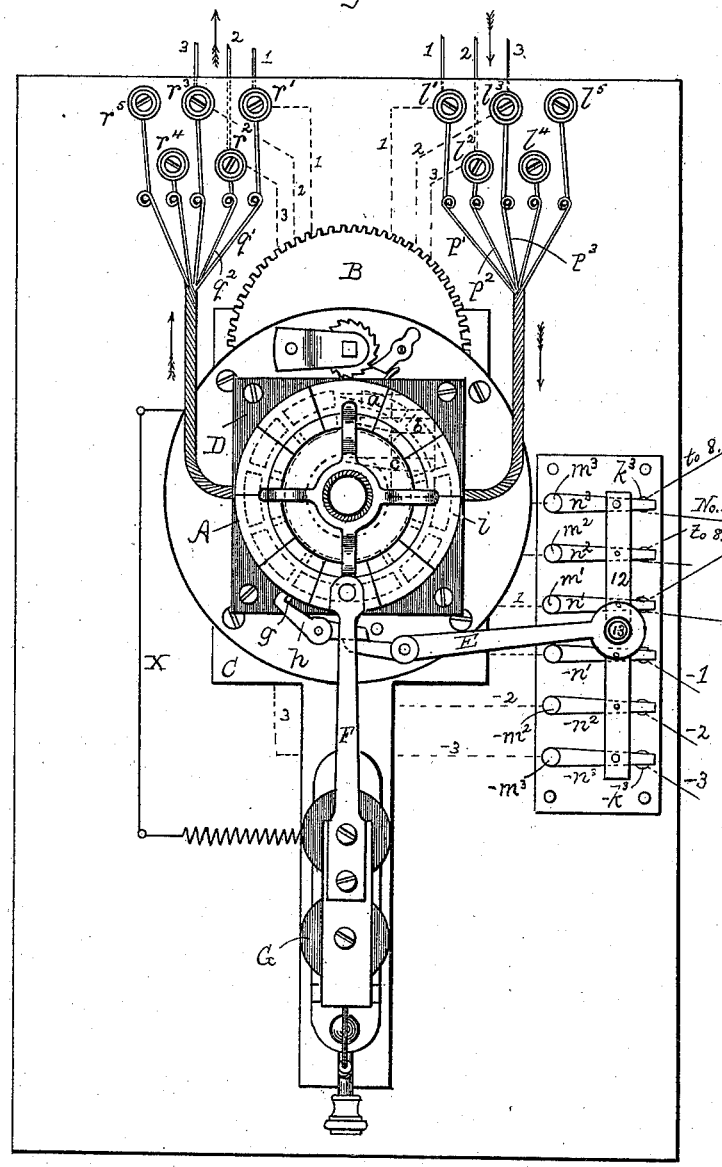
Figure 5:
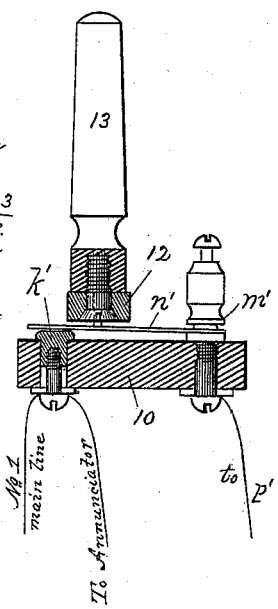
Figure 4:
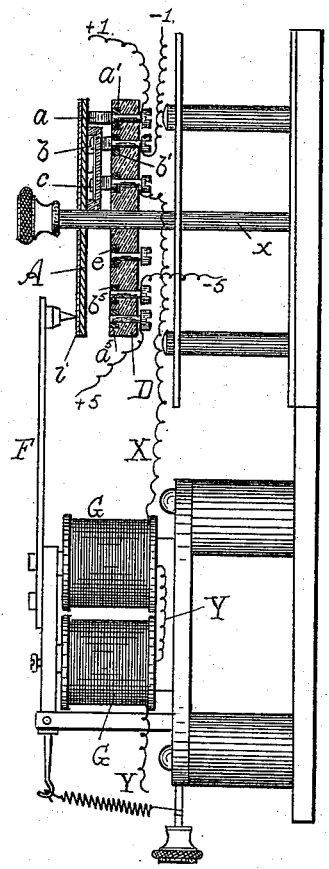
Figure 6:
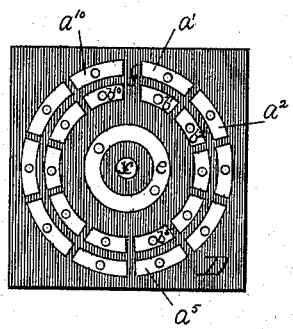
Figure 7:
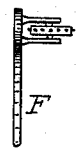
Figure 8:

The drawings accompanying this specification represent, in Figure 1, a diagram of an improved duplex system embodying my invention. Fig. 2 is a plan of the switch-board. Fig. 3 is a front elevation, and Fig. 4 a side elevation, of a circuit-testing apparatus to be employed in connection therewith. Fig. 5 is a sectional elevation enlarged and transversely of the switch-board. Fig. 6 is a plan of the insulating-plate containing the terminals of the several circuits. Figs. 7 and 8 represent an elevation and plan of a modified form of marker.

One feature of this invention is to prevent, even in the event of a break in one of the circuit-wires, any of the thermostats from being cut out from the system, and thus rendered inoperative. To this end I have shown in Fig. 1 a diagram representing in elevation a series of circuits normally open, which extend throughout a building, premising the first-story circuit is No. 1, the second story No. 2, and so on progressively upward, each number corresponding to the floor in which that particular system is located. In this diagram I have provided a "gridiron" or "duplex" system, so-called, with the thermostats at 4 4. Moreover, I have shown the several circuits as metallic and connected with a fire-alarm system, 5, of the most efficient kind, in which either a vibrating alarm-bell, 6, or a circuit breaking or controlling apparatus is located. This system is represented by the heavy broken lines. A galvanic battery is employed at 7 to furnish the requisite current. Connected with the system is an annunciator, 8, provided with drops corresponding to the several floors, and which are united with the circuit-lines from said floors, as designated in the diagram. Furthermore, a series of switches adjusted to move simultaneously are employed in connection with a testing apparatus, 9, the latter being fully described in United States Letters Patent issued to myself March 15, 1887, and numbered 359,338.

The prominent features in this apparatus consist of an insulating-plate, D, in which are arranged the terminals $a'b'$, $a^2 b^2$, $a^3 b^3$ of the several individual circuits. To successively connect these terminals to close and test each of the individual circuits, I employ a metallic disk, A, carrying circuit-closers $a\ b\ c$. The closer $a$ co-operates with all the terminals $a'$ $a^2$ $a^3$, closer $b$ with terminals $b'$ $b^2$ $b^3$, and closer $c$ with terminal $e$. The disk A is moreover provided with a recording-dial, $i$, and is rotated by clock mechanism B, while a wire, X, common to all the circuits, connects with an electro-magnet, G, operating a marker, F, and actively induced by the main current of the system. Vibrating motions of said marker may be produced by the alarm-bell in the circuit. In the event, however, there is no vibratory bell connected with a system the record may be made with a pencil, stylus, or a small rotary wheel on end of the marker F, as shown in Fig. 7. Thus upon release of the clock mechanism the circuit-closers $a\ b\ c$ are rotated, passing successively and quickly over the terminals of every circuit. Release of the clock is effected by actuating the lever E, which disengages the catch-lever $h$ from the stud $g$ on the disk A.

If each circuit is in an efficient condition, the electro-magnet is excited, the marker operated, and a record obtained. If the circuit is imperfect, no record is secured. The above-described apparatus is intended to operate with the duplex systems 1 2 3, (represented in Fig. 1,) which is normally an "open system," so called. The positive wires 1 2 3 of the several circuits pass through the annunciator 8 to their respective posts, $k'$ $k^2$ $k^3$, in the switch-board 10, thence extend through the several stories and enter the posts $l'$ $l^2$ $l^3$ on the clock, finally terminating in the binding-posts $m'$ $m^2$ $m^3$ in the switch-board. A series of switches, $n'$ $n^2$ $n^3$, pivoted upon said posts, $m'$ $m^2$ $m^3$, are united by a transverse rod, 12, of insulating material. The latter has an operating-handle, 13, which is connected with and grasped by the lever E on the circuit-tester. The normal position of said switches is as shown in Fig. 3. Hence in the event of a break at $y$ $y$ in circuit 1 the thermostats on either side of said break are operative to create an alarm.

Intermediary positive wires, $p'$ $p^2$ $p^3$, enter the circuit-tester, as shown, while similar wires, $q'$ $q^2$ $q^3$, for the outgoing current unite with the posts $r'$ $r^2$ $r^3$, the negative wires of the circuits terminating in posts $-m'$ $-m^2$ $-m^3$. The switches which co-operate with the latter are designated as $-n'$ $-n^2$ $-n^3$.

From the above description it is evident that all the thermostats in the several systems are operative, as instanced, by the course of a current through thermostat $4^3$, which, when active, serves to close the circuit at that point. A current is thereby created from the battery 7, annunciator 3, post $k^3$, switch $n^3$, post $m^3$, to post $l^3$, by thermostat to post $r^3$, post $-m^3$, switch $-n^3$, thence upon the alarm-circuit 5 to cause an alarm.

In Fig. 1 the diagram represents the testing of the several circuits to find a break or defect in the wires, if any such exists. In said drawings the switches are thrown to one side of their co-operating steps $k'$ $k^2$ $k^3$ and $-k'$ $-k^2$ $-k^3$ when the currents are compelled to enter and pass through the testing apparatus 9, as will now be shown. The operator or watchman, when he pulls down the lever E by grasping the handle 13, throws all the switches $n$ off from their co-operating steps $k$ and completely breaks all the circuits at this point. Such act releases the catch $h$ from the stud $g$ and permits the clock mechanism B to revolve, thereby rotating the disk A. By actuating the switches, as shown, the currents of the several circuits are successively short-circuited through the testing apparatus; and their passage therethrough will now be briefly described as pertaining to wire 1 on circuit No. 1. The current from battery 7 passes along wire 1 until post $l'$ is reached, but by the position of switch $n'$ it is diverged to wire $p'$, terminal $a'$, closer $a$, disk A, shaft $x$, to wire Y; from the latter to magnet G, wire X, to terminal ring $e$, by closer $c$ to closer $b$ and terminal $b'$, whence it emerges by wire $-q'$ to post $-r'$ and common return-wire 12. If the said circuit is unbroken, the marker, stylus, or wheel will record the fact upon the paper dial $i$, but otherwise no record will be obtained and a defect in any circuit is readily detected and recorded. After testing, the switches are thrown back and the main-line circuits are again closed, with the certainty that the thermostatic fire-alarm or other electrical system is in perfect working condition.

What I desire to claim is—

1. In combination with a series of duplex open circuits, a series of simultaneously-moving switches which control said circuits at a designated point, and the lever connecting said switches with a circuit-testing apparatus and operating both the switches and testing apparatus, a circuit-testing apparatus, as described, having a rotary disk carrying closers, the fixed circuit-terminals, and a series of secondary wires which unite said testing apparatus with the main circuits, whereby movement of the switches serves to open the circuits and release the circuit-testing apparatus, said circuits being successively short-circuited therethrough, for purposes herein set forth and specified.

2. The combination, with a series of duplex open circuits, a series of switches, their operating-lever, the current-generator 7, annunciator 8, and the co-operating fire-alarm system 5, of a circuit-testing apparatus actively set in motion by the switch-lever and composed of a rotary disk, its actuating mechanism, the recording-dial and circuit-closers, which wipe successively the insulated terminals of said duplex open circuits, the electro-magnet common to the latter, and a vibrating marker or movable stylus actuated at each successive test, one of said circuit-closers operating with all the terminals $a'$ $a^2$ of one set, and the other circuit-closer operating with all the terminals $b'$ $b^2$ of the other set in the several circuits upon simultaneous movement of a series of switches, $n'$ $n^2$ and $-n'$ $-n^2$, to open the main circuits, as herein specified.

3. The combination, in an electric duplex system having a pair of switches, $n'$ $-n'$, and the lever E, interconnecting with a circuit-testing apparatus and simultaneously operating said switches and testing apparatus, of a circuit-testing apparatus, 9, substantially as described, and the secondary wires $p'$ $q'$, which short-circuit the current on movement of said switches to open every circuit at a designated point, and the marker F, common to each system, actuated intermittently by such movement and at each successive test of the individual circuits when intact, for purposes herein set forth and described.

In testimony whereof I affix my signature in presence of two witnesses.

ALDEN D. WHEELER.

Witnesses:
 H. E. LODGE,
 E. K. BOYNTON.